United States Patent
Laurent et al.

(10) Patent No.: US 9,830,491 B2
(45) Date of Patent: Nov. 28, 2017

(54) METHOD AND SYSTEM FOR EMBEDDING AND RETRIEVING INFORMATION THROUGH MARKER TRANSFORMATION

(71) Applicant: THOMSON LICENSING, Issy de Moulineaux (FR)

(72) Inventors: Anthony Laurent, Vignoc (FR); Bernard Denis, Plechatel (FR); Jean-Eudes Marvie, Betton (FR); Eric Hubert, Rennes (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/226,072

(22) Filed: Aug. 2, 2016

(65) Prior Publication Data

US 2017/0061186 A1    Mar. 2, 2017

(30) Foreign Application Priority Data

Aug. 25, 2015  (EP) .................................... 15306311

(51) Int. Cl.
*G06K 7/14*    (2006.01)
*G06K 9/00*    (2006.01)
(Continued)

(52) U.S. Cl.
CPC ....... *G06K 7/1456* (2013.01); *G06K 7/10801* (2013.01); *G06K 7/1417* (2013.01);
(Continued)

(58) Field of Classification Search
CPC .......................................... G06K 7/14–7/1456
See application file for complete search history.

(56) References Cited

U.S. PATENT DOCUMENTS

| | | |
|---|---|---|
| 7,922,087 B2 | 4/2011 | Umeda |
| 8,162,220 B2 | 4/2012 | Pettersson et al. |
| | (Continued) | |

FOREIGN PATENT DOCUMENTS

| | | |
|---|---|---|
| CN | 103136543 | 6/2013 |
| CN | 102027510 | 12/2013 |
| | (Continued) | |

OTHER PUBLICATIONS

Search Report dated Feb. 29, 2016.

*Primary Examiner* — Christle I Marshall
(74) *Attorney, Agent, or Firm* — Brian J. Dorini; Xiaoan Lu (57) ABSTRACT

A particular implementation selects two or more fiducial markers to be embedded into a video to convey information. Specifically, the translation, scaling and rotation between a reference marker and a secondary marker can be used to transmit information. When more information needs to be embedded, more secondary markers can be used. The transformation between the fiducial markers can also evolve over time as the information to be embedded evolves over time. At the receiving side, a reader device captures a video including multiple fiducial markers and determines the translation, scaling and rotation between the fiducial markers. Based on the transformation of the fiducial markers, the reader device can retrieve the information embedded in the captured video by the fiducial markers.

18 Claims, 5 Drawing Sheets

(51) Int. Cl.
    *G11B 27/034*     (2006.01)
    *G11B 27/28*     (2006.01)
    *G06K 7/10*     (2006.01)
    *G06K 9/32*     (2006.01)

(52) U.S. Cl.
    CPC ......... *G06K 7/1421* (2013.01); *G06K 7/1443* (2013.01); *G06K 9/00671* (2013.01); *G11B 27/034* (2013.01); *G11B 27/28* (2013.01); *G06K 2009/3225* (2013.01)

(56) References Cited

U.S. PATENT DOCUMENTS

| | | | |
|---|---|---|---|
| 9,360,932 B1* | 6/2016 | Lukashevich | G06F 3/011 |
| 2007/0081695 A1 | 4/2007 | Foxlin et al. | |
| 2011/0102468 A1 | 5/2011 | Seo | |
| 2012/0327088 A1 | 12/2012 | Schnitzer et al. | |
| 2013/0051616 A1 | 2/2013 | Makino et al. | |
| 2013/0141461 A1 | 6/2013 | Salter et al. | |
| 2015/0178971 A1* | 6/2015 | Patrick | G06T 13/20 |
| | | | 345/473 |
| 2015/0339282 A1* | 11/2015 | Goyal | H04N 5/262 |
| | | | 715/229 |

FOREIGN PATENT DOCUMENTS

| | | |
|---|---|---|
| EP | 2450899 | 5/2012 |
| JP | 04889576 | 3/2012 |
| WO | WO2014107681 | 7/2014 |

\* cited by examiner

METHOD AND SYSTEM FOR EMBEDDING AND RETRIEVING INFORMATION THROUGH MARKER TRANSFORMATION

This application claims the benefit under 35 U.S.C. §119 of European Patent Application No. EP15306311.0, filed Aug. 25, 2015.

TECHNICAL FIELD

This invention relates to a method and a system for embedding information in a display and retrieving the information using a reader device, and more particularly, to a method and a system for embedding information in a display using multiple fiducial markers and retrieving the information using a reader device.

BACKGROUND

A fiducial marker is an object placed in the field of view of an imaging system which appears in the image produced, for use as a point of reference or a measure. It may be either something placed into or on the imaging subject, or a mark or set of marks in the reticle of an optical instrument.

Figure 1A:
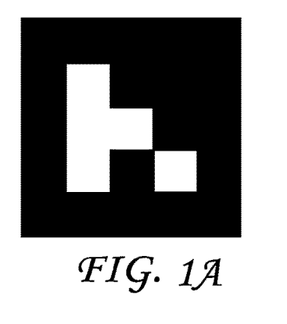
FIGS. 1A, 1B and 1C are pictorial examples illustrating fiducial markers.
Figure 1B:
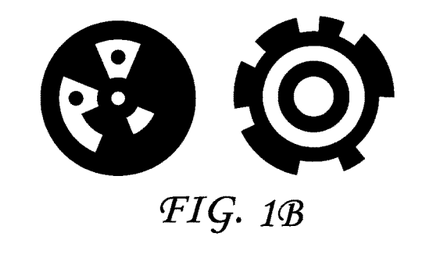
Figure 1C:
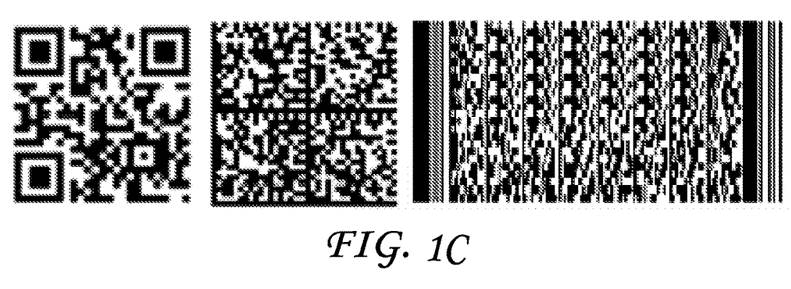

Several exemplary fiducial markers are illustrated in FIGS. 1A, 1B and 1C. In particular, FIG. 1A illustrates a binary ID marker, which usually provides a small range of data. For example, ArUco (a BSD licensed open source software library) provides 1024 different patterns, each associated with an ID between 0 and 1023, and each pattern can be used to represent different information. FIG. 1B illustrates two circular markers, which also usually provide a small range of data. FIG. 1C illustrates binary data markers (for example, QRCode, DataMatrix, PDF417), which can store more information, for example, QR code can provide a data storage up to 2936 bytes.

In general, the more data is to be embedded into a marker, the more detailed the marker will be, and thus the detection of the marker from a distance becomes more difficult.

SUMMARY

A method for embedding information into a video, for subsequent retrieval and processing by a reader device, is presented, comprising: accessing information to be embedded in the video; determining at least one of a distance, ratio of size, translation, and rotation between a first fiducial marker and a second fiducial marker that corresponds to the accessed information; and processing the video to include the first fiducial marker and the second fiducial marker, wherein the first fiducial marker and the second fiducial marker are disposed on the video having the at least one of the determined distance, ratio, translation, and rotation therebetween, whereby a reader device can retrieve the embedded information based on the at least one of the determined distance, ratio, translation and rotation between the first fiducial marker and the second fiducial marker.

According to one embodiment, the accessed information varies over time, and the at least one of the determined distance, ratio, translation, and rotation also varies over time.

According to another embodiment, a plurality types of information are accessed, and a respective one of the at least one of the determined distance, ratio, translation, and rotation is determined for each type of information.

According to another embodiment, a horizontal translation between the first fiducial marker and the second fiducial marker is determined responsive to a first type of the plurality types of information, and a vertical translation between the first fiducial marker and the second fiducial marker is determined responsive to a second type of the plurality types of information.

According to another embodiment, a rotation along the X axis between the first fiducial marker and the second fiducial marker is determined responsive to a first type of the plurality types of information, a rotation along the Y axis between the first fiducial marker and the second fiducial marker is determined responsive to a second type of the plurality types of information, and a rotation along the Z axis between the first fiducial marker and the second fiducial marker is determined responsive to a third type of the plurality types of information.

A method for retrieving information from a video, wherein the video is processed by a controller to include at least a first fiducial marker and a second fiducial marker to embed information, is presented, comprising: determining information, using a reader device, responsive to at least one of a distance, ratio of size, translation, and rotation between the first fiducial marker and the second fiducial marker; and processing the video responsive to the determined information.

According to an embodiment, the determined information includes at least one of a size of an image object and color of the image object.

According to another embodiment, the processing comprises: placing the image object in the video according to the determined at least one of the size and the color.

According to another embodiment, the at least one of the determined distance, ratio, translation, and rotation varies over time, and the determined information also varies over time.

According to another embodiment, a first type of information is determined from a horizontal translation between the first fiducial marker and the second fiducial marker, and a second type of information is determined from a vertical translation between the first fiducial marker and the second fiducial marker.

According to another embodiment, a first type of information is determined from a rotation along the X axis between the first fiducial marker and the second fiducial marker, a second type of information is determined from a rotation along the Y axis between the first fiducial marker and the second fiducial marker, and a third type of information is determined from a rotation along the Z axis between the first fiducial marker and the second fiducial marker.

According to another embodiment, the video is processed to include more than two fiducial markers.

The present embodiments also provide an apparatus for performing any of the methods described above.

A system is presented, comprising: a controller for embedding information into a video, configured to: access information to be embedded in the video, determine at least one of a distance, ratio of size, translation, and rotation between a first fiducial marker and a second fiducial marker that corresponds to the accessed information, and process the video to include the first fiducial marker and the second fiducial marker, wherein the first fiducial marker and the second fiducial marker are disposed on the video having the at least one of the determined distance, ratio, translation, and rotation therebetween; and a reader device for retrieving the information from the video, configured to: determine the information responsive to the at least one of a distance, ratio of size, translation, and rotation between the first fiducial marker and the second fiducial marker, and process the video responsive to the determined information.

The present embodiments also provide a computer readable storage medium having stored thereon instructions embedding information into a video or retrieving information from a video according to the methods described above.

DETAILED DESCRIPTION

A fiducial marker can be a "physical" one, for instance, a 2D fiducial marker printed on a paper or a 3D object placed on a table. A fiducial marker can also be a "virtual" one which is rendered on a screen. In this case a fiducial marker can be a virtual object animated in a scene using a 3D rendering engine.

Fiducial markers are frequently used in various domains, for example, but not limited to, augmented reality, robotics, medical imaging, radio therapy, and PCB (Printed Circuit Board) design. A fiducial marker reader device, which is usually a device with a camera, such as a computer with a webcam or a smartphone with a camera, can be used to capture a scene with a marker and to detect the marker. The reader device is usually provided with the camera intrinsic parameters (i.e., the parameters that characterize the optical, geometric, and digital characteristics of the camera) and the fiducial marker characteristics (e.g., size, shape, symbol). The fiducial marker characteristics can be categorized into two types. In particular, a first type of characteristic is related to identification of the marker, such as the shape and symbol for a 2D fiducial marker and the shape for a 3D fiducial marker, and a second type of characteristic is related to configuration of the marker, such as the size.

Changing the first type of the characteristics effectively replaces a marker, for instance, replacing an ArUco marker with an ID 10 by a new one with an ID 20. It should be noted that the reader device needs to be configured to be able to detect both symbols. The second type of characteristics is linked to the marker itself. In one example, in the context of an augmented reality application, a system is designed to replace an ArUco marker by a virtual scene. If the system is configured to use a marker with a size of 10 cm and to replace the marker by a virtual scene of a given size, then if a marker with a size of 20 cm is used instead, the whole scene may be rendered with a scaling factor of two related to the expected rendering.

If the marker characteristics evolve over time, the system should be aware of the changes, including addition of new markers and new sizes, as soon as they occur. This requires a communication between the system managing the marker evolutions and the system that reads and uses the markers.

From the captured scene, the reader program can recognize and identify the marker and compute the camera pose (position and orientation) relative to the marker. The marker detection results can then be used in various manners depending on the applications. For example, in an augmented reality (AR) application, a marker is placed in a scene to indicate how the marker is to be replaced by an object in the scene. As time evolves, the marker may change from one to another, for example, from marker ID 4 to ID 10 then to ID 20. Using a look-up table that provides a correspondence between the marker ID and the replacement object, the marker may be first replaced by a cube, a ball, and then a cylinder as the marker evolves over time.

Usually, the number of possible symbols is limited. To ensure a good readability of the marker when the reader device moves away, the marker's size must be big enough and the number of possible symbols can be more limited. Moreover, some marker reader programs only support a limited number of symbols (for example, 1024 for ArUco) which may be too restrictive for the type of information to be provided.

The present principles are directed to information embedding and retrieval using multiple markers. In one embodiment, we use the relationship between a reference marker and a secondary marker to transmit and receive information. In particular, the transformation, for example, but not limited to, the translation (i.e., the displacements), scaling (or the ratio of size) and rotation, of the secondary marker with respect to the reference marker may be used to transmit and receive information.

Different markers can be used for the reference and the secondary markers, for instance, if using 3D markers, the reference marker corresponding to a bottle and the secondary marker corresponding to a glass. In one embodiment, we assume that, once both markers are selected, their symbols (for example, ArUco ID) do not change but they will only be transformed.

Figure 2:
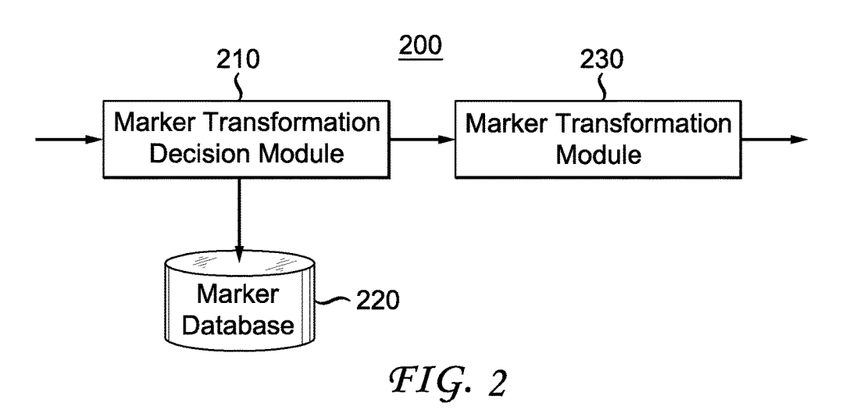
FIG. 2 is a block diagram depicting an exemplary system that uses and manages two markers to embed information, in accordance with an embodiment of the present principles.

FIG. 2 illustrates an exemplary controller 200 that uses two markers to embed information according to an embodiment of the present principles. The input to controller 200 includes the information to be embedded, and the markers can be obtained from marker database 220. Given the information to be embedded, marker transformation decision module (210) decides the transformation for the secondary marker. Subsequently, marker transformation module 230 places the markers according to the transformation, for example, using a rendering software to overlay the markers on a scene and then renders the scene on a screen, or disposing the physical markers precisely at desired locations by a robot.

The present principles can be applied to both physical and virtual markers, and are probably more relevant for virtual ones because they can be transformed automatically and more precisely using a rendering engine. In the following, we focus on the use of a rendering software to transform the markers. We also assume that the markers are projected to the screen plane (the screen where the markers are), wherein the projection can be achieved by a virtual camera embedded in the rendering software. The intrinsic parameters of the virtual camera should be known by the reader device if we want to embed information along the Z-axis (depth).

Figure 3:
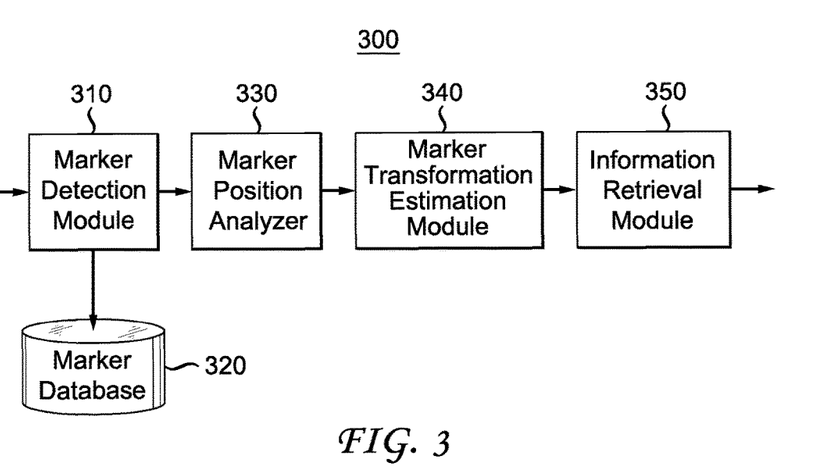
FIG. 3 is a block diagram depicting an exemplary system that retrieves information using two markers, in accordance with an embodiment of the present principles.

FIG. 3 illustrates an exemplary reader device 300 for retrieving information from markers, according to an embodiment of the present principles. A reader device may contain one or more cameras. The reader device is provided with the camera intrinsic parameters and the fiducial marker characteristics. From a captured scene, a marker detection module (310) can detect the markers and compute their camera poses (positions and orientations) relative to the markers.

When the reader device has several cameras, the reader device needs to be aware of the positions of the cameras as well as their intrinsic parameters to estimate globally the characteristics of the markers. Existing solutions can be used for marker detection and camera pose estimation. For instance, a dedicated open source library such as ArUco needs to be configured with intrinsic parameters of the reader camera(s), as well as attributes of each marker (for example, pattern ID, and size). The reader device uses the library to detect only markers having one of the specified IDs and compute the estimated camera pose for each marker. In one example, the application may only focus on markers with IDs 200 and 201 and would perform a specific action for each of these markers. If a marker with another ID is detected, the application may not perform any action.

One of the detected markers is used as a reference (identified by a specific ID), the difference of camera poses between the reference marker and other markers will provide the needed data to compute and retrieve the embedded information.

Referring back to FIG. 3, the reader device reads the marker database (320) to get the marker characteristics. Based on the markers detected from the captured scene, a marker position analyzer (330) estimates the camera pose (e.g., position and orientation) for each marker, for example, using camera estimation algorithm POSIT and its variations. The output includes the camera position and orientation with respect to each marker, which can be written as a 3D transformation matrix relative to the orthonormal basis defined by a marker. Assuming a reference marker A and a secondary marker B, we can obtain:

$$M_A = \begin{pmatrix} RA & TA \\ 0 & 1 \end{pmatrix} = \begin{pmatrix} rA_{11} & rA_{12} & rA_{13} & tA_x \\ rA_{21} & rA_{22} & rA_{23} & tA_y \\ rA_{31} & rA_{32} & rA_{33} & tA_z \\ 0 & 0 & 0 & 1 \end{pmatrix}$$

$$M_B = \begin{pmatrix} RB & TB \\ 0 & 1 \end{pmatrix} = \begin{pmatrix} rB_{11} & rB_{12} & rB_{13} & tB_x \\ rB_{21} & rB_{22} & rB_{23} & tB_y \\ rB_{31} & rB_{32} & rB_{33} & tB_z \\ 0 & 0 & 0 & 1 \end{pmatrix}$$

where $M_A$ or $M_B$ is a camera pose matrix, RA or RB is a 3×3 rotation matrix, and TA or TB is a translation vector.

Then a marker transformation estimation module (340) obtains the transformation information of the markers. This module uses the result provided by the previous module (i.e. the camera poses with respect to both markers) to estimate the transformation of the secondary marker with respect to the reference marker.

Specifically, the inverse matrices of $M_A$ and $M_B$ define the inverse transformations: from the camera to the markers. Let P be the transformation matrix from marker A to marker B, we can write:

$$M_A^{-1} \cdot P = M_B^{-1}$$

i.e., camera to marker A·marker A to marker B=camera to marker B. Then we can get $$P = M_B^{-1} M_A.$$

The transformation matrix P can be written as:

$$P = \begin{pmatrix} RP & TP \\ 0 & 1 \end{pmatrix} = \begin{pmatrix} rP_{11} & rP_{12} & rP_{13} & tP_x \\ rP_{21} & rP_{22} & rP_{23} & tP_y \\ rP_{31} & rP_{32} & rP_{33} & tP_z \\ 0 & 0 & 0 & 1 \end{pmatrix}$$

where TP indicates the translation vector between the two markers along the camera orthogonal basis (three axes X, Y and Z) and RP matrix contains both rotation and scaling information.

Based on the marker transformation, an information retrieval module (350) retrieves the information embedded in the scene by the markers. This module estimates the new information from the position and orientation of the secondary marker related to the reference marker. Estimation can be based on a reference dataset including, for example, but not limited to, an algorithm or a look-up table, provided to this module.

In the following, we describe several exemplary embodiments that use two fiducial markers to embed or retrieve information.

Figure 4:
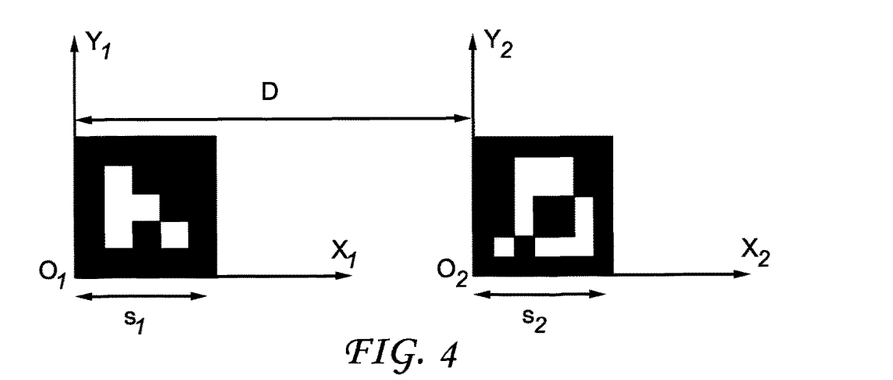
FIG. 4 is pictorial example illustrating two fiducial markers with a distance D.

FIG. 4 illustrates an example of positioning two markers, wherein one marker is to be considered as the reference marker and the other one as the secondary marker. Using ArUco as an example, each marker corresponds to an ID, which is an integer value between 0 and 1023. Here, the ID can be used to distinguish the reference marker from the secondary one when two IDs are different. If the IDs are the same, we can set, for example, the marker located on the left of the scene (in the screen projection plane) as the reference marker.

We consider a first orthonormal basis with an origin ($O_1$) located at the bottom left corner of the reference marker, with the X axis ($X_1$) along the bottom side and the Y axis ($Y_1$) along the left side and a second orthonormal basis with an origin ($O_2$) located at the bottom left corner of the secondary marker, with the X axis ($X_2$) along the bottom side and the Y axis ($Y_2$) along the left side. We assume that both markers are coplanar, so we work on a 2D plane, namely, in the reference marker plane. We also assume that the basis ($O_2$, $X_2$, $Y_2$) is the translation of the basis ($O_1$, $X_1$, $Y_1$) along the X axis and the origins of both markers are spaced apart by a distance D. The reference marker has a given side size $s_1$ and the secondary one has a given side size $s_2$. One interest of using the translation (i.e. the displacements along the X and Y axis) is that we can transmit two uncorrelated values, for example, the X value indicates a shape and the Y axis indicates the color or size.

For each of the reference marker and the secondary marker, we use a distinctive point when computing the relationship between these two markers. For the reference marker, the origin ($O_1$) of the basis ($O_1$, $X_1$, $Y_1$) can be used as the distinctive point. For the secondary marker, the origin ($O_2$) of the basis ($O_2$, $X_2$, $Y_2$) can be used as the distinctive point. The distinctive point can also be the center, the bottom left point or another point according to the type of marker. The choice of distinctive point is independent of the reader device's position and a reader device's distance to the reference marker plane. The receiving side (e.g., a reader) knows what are the distinctive points used at the transmitting side.

In the present application, the "distance" between a reference marker and a secondary marker refers to the distance between the distinctive point of the reference marker and the distinctive point of the secondary marker, in the reference marker plane.

In one embodiment, the markers are of constant sizes, $s_1$ and $s_2$ for the reference marker and the secondary marker, respectively, which are also known to the reader device. In this embodiment, the estimation of distance can be achieved if the markers' size remains constant over time. The reader device knows the sizes of the markers when estimating the distance between the markers. We can embed information using the evolution of the distance D, each distance value or a range of distance values corresponding to a value of the information to be embedded.

According to the type of data to be embedded, a look-up table may be used to make the correspondence between the distance and the embedded information. For example, the distance between two markers can be used to embed temperature information as: temperature=⌊distance⌋+c, where distance is measured in cm and c is a constant. In another example, when a reference marker is to be replaced by an object (for example, a building), the distance between the markers can be used to indicate the size of the object. The reader device can compute and change the object size based on the distance (D) evolution.

In another embodiment, we maintain the distance D and adjust the secondary marker side size $s_2$. Information can be embedded based on the evolution of the ratio $s_2/D$. In particular, each ratio value or a range of ratio values can correspond to a value of the information to be provided. In a variation, we may also consider the marker area instead of the marker side size, that is, we may consider the evolution of area/D to embed information.

The markers as shown in FIG. 4 are squares, and they could be of a different shape, such as a rectangle or a circle. When a marker is a rectangle, its size can be set to be the size of one of the sides of the marker. When a marker is a circle, its size can be set to be the radius or diameter of the marker and the origin may be located at the center of the marker.

In the present application, the size of a marker corresponds to the dimension of the marker as rendered/placed. For a virtual marker, the size is the measure of the part directly on the screen in the reference marker plane. This size is independent of the distance between reader device and the screen. More generally, the translation or distance of a marker refers to the translation or distance in the reference marker plane.

In another variation, we may consider the ratio $s_1/s_2$ by increasing/reducing the side size. In this case, the distance between the markers is not taken into consideration. Only the marker side sizes $s_i$ are used. Hence, the distance D may be constant or evolve, and would not affect the information to be embedded.

In the above, we described several embodiments that uses a single degree of freedom (also referred to as "variable" below) to embed information. For example, we adjust the distance, or the size of the secondary marker to embed information. On the information retrieval side, the reader device is configured to know which variable to monitor and to which data each variable value corresponds.

Figure 5:
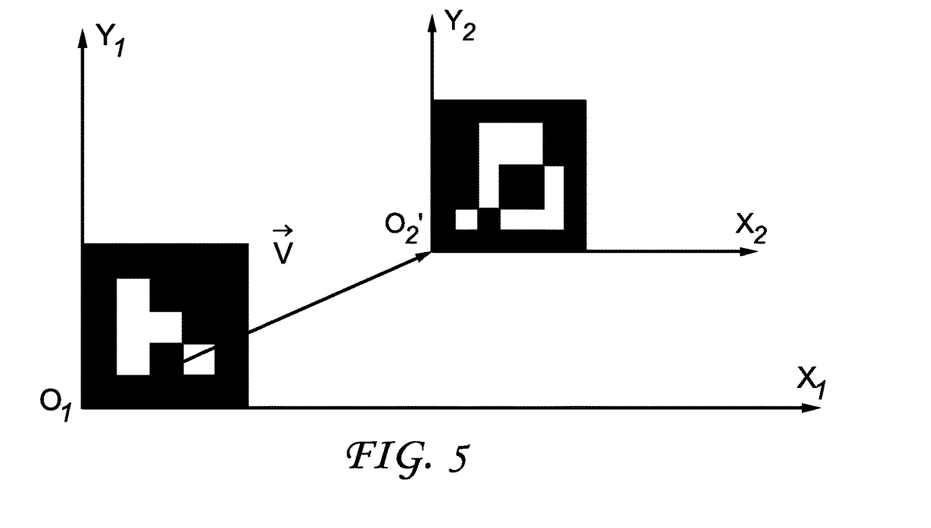
FIG. 5 is pictorial example illustrating two fiducial markers with a translation $\vec{V}$.

In other embodiments, more variables can be used to embed more information. For example, we can use two respective variables to indicate the change in both the color and size of an object. As illustrated in FIG. 5, we may allow the secondary mark to translate in both directions, and use the horizontal translation to indicate the change in the object color and the vertical translation to indicate the change in the object size. Also we can use the Z-axis to embed information.

In the following, we describe several embodiments that uses more variables, which can embed more information simultaneously.

Figure 6:
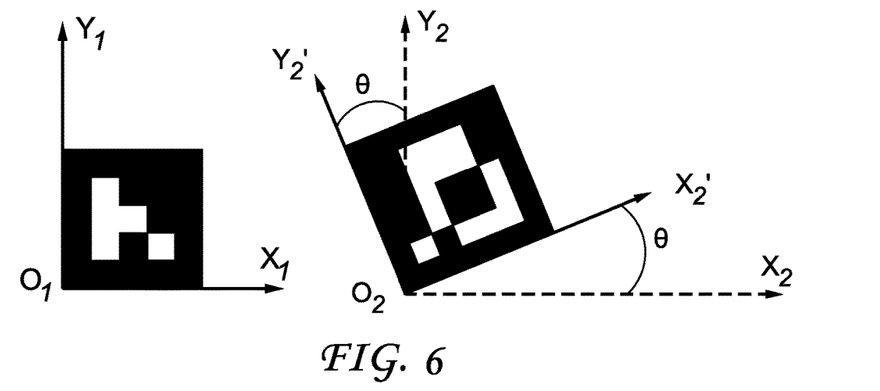
FIG. 6 is pictorial example illustrating two fiducial markers with a rotation.

In one example, we can use the rotation of the secondary marker with respect to the reference marker to transmit information. FIG. 6 illustrates an exemplary configuration where a secondary marker rotates with respect to a reference marker. The basis $(X_2, Y_2)$ can be rotated to $(X_2', Y_2')$. Rotation along each axis can be used to transmit information, one per axis of rotation: θx along the X axis, θy along the Y axis, and θz along the Z axis if in 3D.

Figure 7:
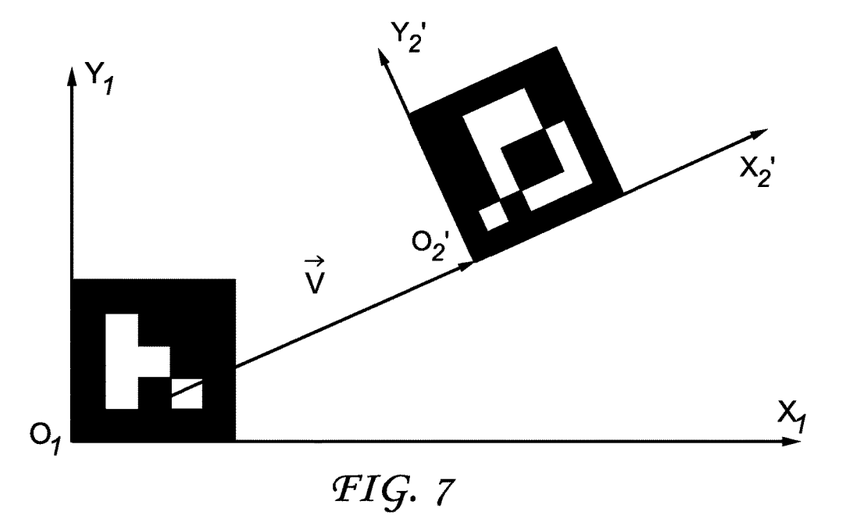
FIG. 7 is pictorial example illustrating two fiducial markers with a translation $\vec{V}$ and a rotation.

In yet another example, we may consider both translation and rotation to embed information. FIG. 7 illustrates an exemplary configuration wherein a secondary marker is translated and rotated with respect to a reference marker. If the reader device has information about the virtual camera parameters, this embodiment can embed additional information using the translation and rotation along the Z-axis.

To increase the number of pieces of information that can be embedded, we can use more than one secondary marker. The transformation (for example, translation and rotation) of each secondary marker related to the reference marker can embed various pieces of information.

The information to be embedded can include, but not limited to, status (ok/fault) in automated system supervision, temperature, pressure. The information can also be used as indication of parking lot vacancy: at the entrance of the parking lot, two markers are used to encode, using a look up table, the number of vacant spots. Inside an automated car, a camera detects those markers and knows whether or not to enter the parking lot to park. In semi-automated cars navigation, using object detection, current navigation system can already detect the speed of the car just in front. The present embodiments provide a way for instance, to display (using dynamic fiducial markers) under its rear window critical data otherwise invisible: speed of the car in front, angle of its own direction, and warning if a danger is detected. Consequently, critical navigation data can be propagated from one car to another in a "chained optical network."

In the above, we described various embodiments to embed the information. At the information retrieval side, the inverse process can be performed to retrieve the embedded information. When the particular embodiments are described using fiducial markers with specific shapes, the present principles can be applied to fiducial markers with different shapes.

Figure 8:
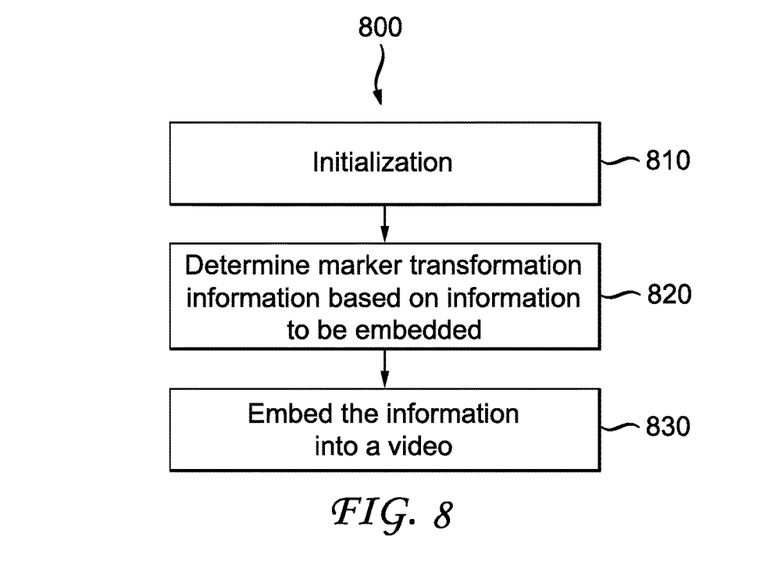
FIG. 8 is a flow diagram depicting an exemplary method for embedding information through multiple markers, according to an embodiment of the present principles.

FIG. 8 shows an exemplary method 800 for embedding information in a video using two or more fiducial markers, according to an embodiment of the present principles. At the initialization step 810, a controller may receive the information to be embedded, and decide which markers and which method of information embedding are to be used. At step 820, based on the information to be embedded, the marker transformation information, for example, translation, scaling, and/or rotation between two markers, can be determined At step 830, the markers are placed into the video according to the transformation determined at step 820.

Figure 9:
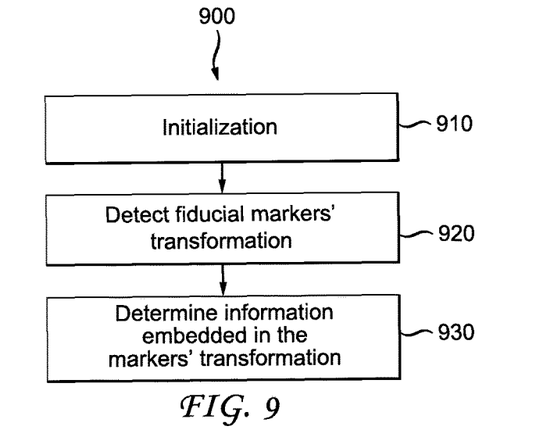
FIG. 9 is a flow diagram depicting an exemplary method for retrieving information through multiple markers, according to an embodiment of the present principles.

FIG. 9 shows an exemplary method 900 for retrieving information using two or more fiducial markers, according to an embodiment of the present principles. At the initialization step 910, a reader device may capture a video with multiple fiducial markers, for example, embedded using method 800, and receive the method of information embedding that is used. At step 920, the reader device detects the transformation between the markers, for example, the translation, scaling, and/or rotation between two markers.

At step 930, the reader device determines the information that is embedded in the markers based on the transformation determined at step 920. Subsequently, in use cases where the captured video is enriched, it is processed based on the information retrieved at step 930, for example, replacing a reference marker with an image object at a size or color indicated by the retrieved information.

By including the markers in a scene, the information conveyed by the markers about the scene is easily synchronized with the scene, and is directly available from the scene itself. Also, the change in the data can be detected immediately. In addition, the proposed method is robust to network congestion and radio waves interferences, and is more robust than classical Optical Character Recognition (OCR). Since the detector(s) must know the way to decode the data and the markers are not human readable, the proposed method may also provide good privacy.

The present embodiments provide various methods for embedding and retrieving information using the relationship between fiducial markers, which provide a range of non-discrete values to embed more information. Also the present embodiments enable a system to embed multiple types of information at the same time.

In the above, we assume that the reference marker does not change and it is the secondary marker that changes to transmit information. As the secondary marker transforms dynamically (for example, translates, rotates and/or scales), different information can be transmitted. The present principles can also be applied when the reference marker also changes or when there are more than one reference marker. As the secondary marker pose are computed from the reference marker, it does not make much sense to change the reference marker's characteristics. But if the reference marker evolves over time, its new characteristics must be known from the reader device in real time.

Figure 10:
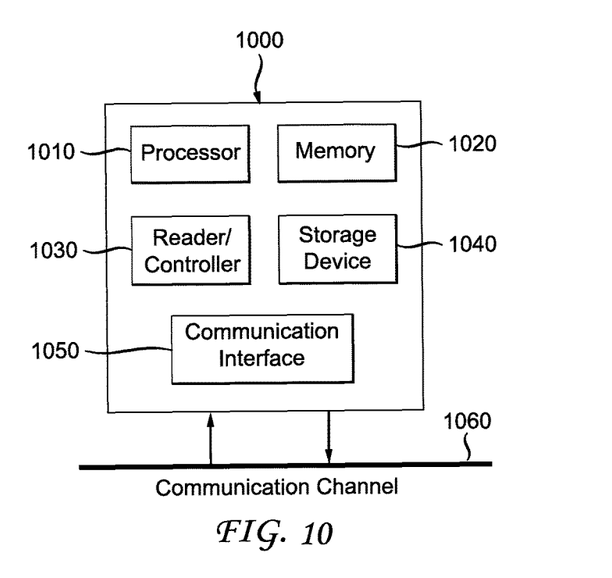
FIG. 10 illustrates a block diagram depicting an exemplary system in which various aspects of the exemplary embodiments of the present principles may be implemented.

FIG. 10 illustrates a block diagram of an exemplary system in which various aspects of the exemplary embodiments of the present principles may be implemented. System 1000 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, smart glasses and servers. System 1000 may be communicatively coupled to other similar systems, and to a display via a communication channel as shown in FIG. 10 and as known by those skilled in the art to implement the exemplary system described above.

The system 1000 may include at least one processor 1010 configured to execute instructions loaded therein for implementing the various processes as discussed above. Processor 1010 may include embedded memory, input output interface and various other circuitries as known in the art. The system 1000 may also include at least one memory 1020 (e.g., a volatile memory device, a non-volatile memory device). System 1000 may additionally include a storage device 1040, which may include non-volatile memory, including, but not limited to, EEPROM, ROM, PROM, RAM, DRAM, SRAM, flash, magnetic disk drive, and/or optical disk drive. The storage device 1040 may comprise an internal storage device, an attached storage device and/or a network accessible storage device, as non-limiting examples. System 1000 may also include a reader device/controller module 1030 configured to embed or retrieve information using multiple fiducial markers.

The reader device/controller module 1030 represents the module(s) that may be included in a device to perform the embedding and/or retrieving functions. As is known, a device may include one or both of the embedding and retrieving modules. Additionally, reader device/controller module 1030 may be implemented as a separate element of system 1000 or may be incorporated within processors 1010 as a combination of hardware and software as known to those skilled in the art.

Program code to be loaded onto processors 1010 to perform the various processes described hereinabove may be stored in storage device 1040 and subsequently loaded onto memory 1020 for execution by processors 1010. In accordance with the exemplary embodiments of the present principles, one or more of the processor(s) 1010, memory 1020, storage device 1040 and reader device/controller module 1030 may store one or more of the various items during the performance of the processes discussed herein above, including, but not limited to the input video, the processed video, marker database, image objects, equations, formula, matrices, variables, operations, and operational logic.

The system 1000 may also include communication interface 1050 that enables communication with other devices via communication channel 1060. The communication interface 1050 may include, but is not limited to a transceiver configured to transmit and receive data from communication channel 1060. The communication interface may include, but is not limited to, a modem or network card and the communication channel may be implemented within a wired and/or wireless medium. The various components of system 1000 may be connected or communicatively coupled together using various suitable connections, including, but not limited to internal buses, wires, and printed circuit boards.

The exemplary embodiments according to the present principles may be carried out by computer software implemented by the processor 1010 or by hardware, or by a combination of hardware and software. As a non-limiting example, the exemplary embodiments according to the present principles may be implemented by one or more integrated circuits. The memory 1020 may be of any type appropriate to the technical environment and may be implemented using any appropriate data storage technology, such as optical memory devices, magnetic memory devices, semiconductor-based memory devices, fixed memory and removable memory, as non-limiting examples. The processor 1010 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), smart glasses and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for embedding information into a video by at least a processor, for subsequent retrieval and processing by a reader device, comprising:
   accessing, by said at least a processor, information to be embedded in the video;
   determining, by said at least a processor, at least one of a distance, ratio of size, translation, and rotation, between a first fiducial marker and a second fiducial marker, that corresponds to the accessed information, wherein the accessed information varies over time, and wherein the at least one of the determined distance, ratio, translation, and rotation also varies over time; and
   processing, by said at least a processor, the video to include the first fiducial marker and the second fiducial marker, wherein the first fiducial marker and the second fiducial marker are disposed on the video having the at least one of the determined distance, ratio, translation, and rotation therebetween, whereby a reader device can retrieve the embedded information based on the at least one of the determined distance, ratio, translation and rotation between the first fiducial marker and the second fiducial marker.

2. The method of claim 1, wherein a plurality types of information are accessed, and wherein a respective one of the at least one of the determined distance, ratio, translation, and rotation is determined for each type of information.

3. The method of claim 2, wherein a horizontal translation between the first fiducial marker and the second fiducial marker is determined responsive to a first type of the plurality types of information, and a vertical translation between the first fiducial marker and the second fiducial marker is determined responsive to a second type of the plurality types of information.

4. The method of claim 2, wherein a rotation along the X axis between the first fiducial marker and the second fiducial marker is determined responsive to a first type of the plurality types of information, a rotation along the Y axis between the first fiducial marker and the second fiducial marker is determined responsive to a second type of the plurality types of information, and a rotation along the Z axis between the first fiducial marker and the second fiducial marker is determined responsive to a third type of the plurality types of information.

5. A method for retrieving information from a video, wherein the video is processed by at least a processor to include at least a first fiducial marker and a second fiducial marker to embed information, comprising:
   determining information, using a reader device, responsive to at least one of a distance, ratio of size, translation, and rotation between the first fiducial marker and the second fiducial marker, wherein the at least one of the distance, ratio, translation, and rotation varies over time, and wherein the determined information also varies over time; and
   processing, by said at least a processor, the video responsive to the determined information.

6. The method of claim 5, wherein the determined information includes at least one of a size of an image object and color of the image object.

7. The method of claim 6, wherein the processing comprises:
   placing the image object in the video according to the determined at least one of the size and the color.

8. The method of claim 5, wherein a first type of information is determined from a horizontal translation between the first fiducial marker and the second fiducial marker, and a second type of information is determined from a vertical translation between the first fiducial marker and the second fiducial marker.

9. The method of claim 5, wherein a first type of information is determined from a rotation along the X axis between the first fiducial marker and the second fiducial marker, a second type of information is determined from a rotation along the Y axis between the first fiducial marker and the second fiducial marker, and a third type of information is determined from a rotation along the Z axis between the first fiducial marker and the second fiducial marker.

10. An apparatus for embedding information into a video, comprising at least a memory and one or more processors, the one or more processors being configured to:
    access information to be embedded in the video;
    determine at least one of a distance, ratio of size, translation, and rotation, between a first fiducial marker and a second fiducial marker, that corresponds to the accessed information, wherein the accessed information varies over time, and wherein the at least one of the determined distance, ratio, translation, and rotation also varies over time; and
    process the video to include the first fiducial marker and the second fiducial marker, wherein the first fiducial marker and the second fiducial marker are disposed on the video having the at least one of the determined distance, ratio, translation, and rotation therebetween.

11. The apparatus of claim 10, wherein a plurality types of information are accessed, and wherein a respective one of the at least one of the determined distance, ratio, translation, and rotation is determined for each type of information.

12. The apparatus of claim 11, wherein a horizontal translation between the first fiducial marker and the second fiducial marker is determined responsive to a first type of the plurality types of information, and a vertical translation between the first fiducial marker and the second fiducial marker is determined responsive to a second type of the plurality types of information.

13. The apparatus of claim 11, wherein a rotation along the X axis between the first fiducial marker and the second fiducial marker is determined responsive to a first type of the plurality types of information, a rotation along the Y axis between the first fiducial marker and the second fiducial marker is determined responsive to a second type of the plurality types of information, and a rotation along the Z axis between the first fiducial marker and the second fiducial marker is determined responsive to a third type of the plurality types of information.

14. An apparatus for retrieving the information from the video, comprising at least a memory and one or more processors, wherein the video is processed by a controller to include at least a first fiducial marker and a second fiducial marker to embed information, the one or more processors being configured to:
    determine information responsive to at least one of a distance, ratio of size, translation, and rotation between the first fiducial marker and the second fiducial marker, wherein the at least one of the distance, ratio, translation, and rotation varies over time, and wherein the determined information also varies over time; and
    process the video responsive to the determined information.

15. The apparatus of claim 14, wherein the determined information includes at least one of a size of an image object and color of the image object.

16. The apparatus of claim 15, wherein the one or more processors are further configured to place the image object in the video according to the determined at least one of the size and the color.

17. The apparatus of claim 14, wherein a first type of information is determined from a horizontal translation between the first fiducial marker and the second fiducial marker, and a second type of information is determined from a vertical translation between the first fiducial marker and the second fiducial marker.

18. The apparatus of claim 14, wherein a first type of information is determined from a rotation along the X axis between the first fiducial marker and the second fiducial marker, a second type of information is determined from a rotation along the Y axis between the first fiducial marker and the second fiducial marker, and a third type of information is determined from a rotation along the Z axis between the first fiducial marker and the second fiducial marker.

* * * * *